US011720975B2

(12) United States Patent
Srikanta et al.

(10) Patent No.: US 11,720,975 B2
(45) Date of Patent: Aug. 8, 2023

(54) SYSTEMS AND METHODS FOR MULTI-PURSE TRANSACTION FILE SPLITTING

(71) Applicant: FMR LLC, Boston, MA (US)

(72) Inventors: Thejaswini Srikanta, Cary, NC (US); Jayesh Parab, Morrisville, NC (US); Pradeep Srinivasan Madhu, Morrisville, NC (US)

(73) Assignee: FMR LLC, Boston, MA (US)

( * ) Notice: Subject to any disclaimer, the term of this patent is extended or adjusted under 35 U.S.C. 154(b) by 6 days.

(21) Appl. No.: 17/090,488

(22) Filed: Nov. 5, 2020

(65) Prior Publication Data

US 2022/0138865 A1 May 5, 2022

(51) Int. Cl.
*G06Q 40/00* (2023.01)
*G06Q 20/34* (2012.01)
*G06F 16/18* (2019.01)
*G06F 21/60* (2013.01)
*H04L 9/08* (2006.01)
*G06Q 20/36* (2012.01)
*G06Q 40/02* (2023.01)
*G06Q 20/38* (2012.01)
*G06Q 40/12* (2023.01)

(52) U.S. Cl.
CPC ......... *G06Q 40/12* (2013.12); *G06F 16/1865* (2019.01); *G06F 21/602* (2013.01); *G06Q 20/34* (2013.01); *G06Q 20/3674* (2013.01); *G06Q 20/3676* (2013.01); *G06Q 20/389* (2013.01); *G06Q 40/02* (2013.01); *H04L 9/0861* (2013.01); *G06Q 2220/00* (2013.01)

(58) Field of Classification Search
CPC .... G06Q 40/12; G06Q 20/34; G06Q 20/3674; G06Q 20/3676; G06Q 20/389; G06Q 40/02; G06Q 2220/00; G06F 16/1865; G06F 21/602; H04L 9/0861
See application file for complete search history.

(56) References Cited

U.S. PATENT DOCUMENTS

| 5,949,045 A * | 9/1999 | Ezawa | G06Q 40/08 |
| | | | 705/16 |
| 6,012,049 A * | 1/2000 | Kawan | G06Q 30/0641 |
| | | | 379/91.01 |
| 6,609,114 B1 * | 8/2003 | Gressel | G06Q 20/105 |
| | | | 705/50 |

(Continued)

*Primary Examiner* — Talia F Crawley
(74) *Attorney, Agent, or Firm* — Cesari & McKenna, LLP

(57) ABSTRACT

Systems and methods for distributing transaction files among accounts corresponding to a physical card. The method includes receiving a transaction file from a transaction processing entity. The transaction file is associated with a physical card. The method also includes identifying at least one purse segment in the transaction file. Each purse segment corresponds to a transaction associated with the physical card. The method further includes, for each of the at least one purse segments, identifying a purse ID corresponding to at least one account associated with the physical card and extracting transaction data from the transaction file corresponding to the purse ID. The method also includes, for each of the at least one purse segments, storing the transaction data corresponding to the purse ID into a distribution file and transmitting the distribution file to an account processing system.

15 Claims, 6 Drawing Sheets

(56) References Cited

U.S. PATENT DOCUMENTS

| | | |
|---|---|---|
| 8,925,802 B1 | 1/2015 | Pletz et al. |
| 10,878,404 B2 * | 12/2020 | Lu .................... G06Q 20/3672 |
| 2002/0145051 A1 * | 10/2002 | Charrin ............... G06K 19/077 |
| | | 235/492 |
| 2003/0236748 A1 * | 12/2003 | Gressel ................ G07F 7/0866 |
| | | 705/41 |
| 2008/0120234 A1 | 5/2008 | Jagatic et al. |
| 2009/0192904 A1 | 7/2009 | Patterson et al. |
| 2011/0131133 A1 | 6/2011 | Hirka et al. |
| 2013/0282563 A1 | 10/2013 | Masterson et al. |

* cited by examiner

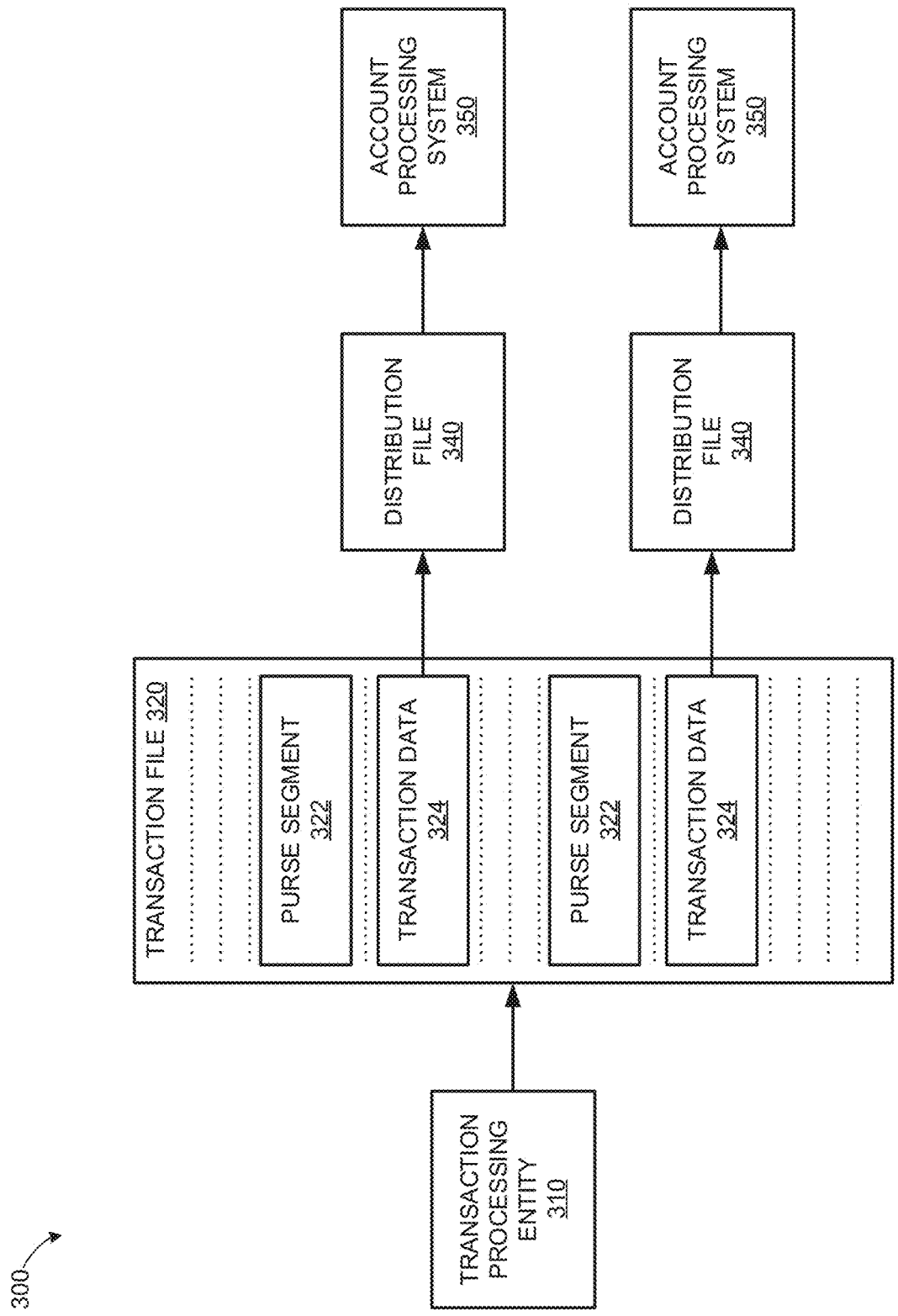

324

| Field | Field in 003 | Start Position | Size | Type |
|---|---|---|---|---|
| Transaction date | AUTH-TRANSACTION-DATE | 0 | 6 | PIC 9(6) |
| Transaction code | AUTH-TRAN-CODE | 6 | 2 | XX |
| Total Transaction amount | AUTH-TRANSACTION-AMOUNT | 8 | 15 | PIC 9(12).99. |
| Total Transaction amount Indicator | AUTH-TRANSACTION-AMT-IND | 23 | 1 | X |
| Account Number | AUTH-CHD-ACCOUNT-NO | 24 | 16 | PIC 9(16) |
| Merchant Details | ------- | 40 | 57 | --- |
| Merchant Number | AUTH-ENTERED-MERCH-NUM | 40 | 16 | PIC X(16) |
| Merchant name | AUTH-MRCH-NAME | 56 | 25 | PIC X(25) |
| Merchant City | AUTH-MRCH-CITY-NM | 81 | 13 | PIC X(13) |
| Merchant Country Code | AUTH-ST-CTRY-CD | 94 | 3 | PIC X(3) |
| Purse Name | AUTH-FUND-BAL-PROMO-ID | 97 | 8 | PIC X(8) |
| Purse Amount | AUTH-FUND-BAL-AUTH-AM | 105 | 15 | PIC X(15) |
| Purse Amount Indicator | AUTH-FUND-BAL-AUTH-AM-IND | 120 | 1 | X |
| Auth Pin Verify | AUTH-PIN-VERIFY | 121 | 1 | X |
| MCC Code | AUTH_MERCH_CAT_NUM | 122 | 4 | 9(4) |
| Card Number | AUTH_ENTERED_ACCT | 126 | 16 | X(16) |
| Transaction Time | AUTH-TIME-ENTERED-HHMMSS | 142 | 6 | 9(6) |
| Unique Transaction Identifier | AUTH-INDUSTRY-TRAN-ID | 148 | 16 | PIC 9(16) |

| Field | Field in 037 | Position | Size | Type |
|---|---|---|---|---|
| Account Number | RDT_CHD_ACCOUNT_NUMBER | 32 | 16 | ebcdic string(16) |
| Card Number | RDT_ENTERED_CHD_ACCT_NO / RDT_DP_ENTERED_ACCT_NO | 154 | 16 | ebcdic string(16) |
| MCC Code | RDT_MRCH_SIC_CODE | 148 | 6 | ebcdic decimal(6, 0) |
| Merchant Details | RDT_MERCHANT_DESCR | 64 | 40 | ebcdic string(40) |
| Merchant Number | RDT_MRCH_ACCOUNT_NUMBER / RDT_DR_MERCHANT_NUMBER | 48 | 16 | ebcdic string(16) |
| Purse Amount | RDT_MULT_PURS_AM / RDT_MP_ADJ_NETCHG_BAL_AM | 113 | 19 | ebcdic decimal(19.2) |
| Purse Amount Indicator | --- | 112 | 1 | ebcdic string(1) |
| Purse Name | RDT_MULT_PURS_PROMO_ID / RDT_MP_BLNC_ADJ_PROMO_ID | 104 | 8 | ebcdic string(8) |
| Total Transaction amount | RDT_TRANSACTION_AMOUNT / RDT_DP_NET_ADJ_AMOUNT / RDT_DR_MTI_NET_TRAN_AMT | 13 | 19 | ebcdic decimal(19.2) |
| Total Transaction Amount Indicator | --- | 12 | 1 | ebcdic string(1) |
| Transaction Code | RDT_TRANSACTION_CODE | 8 | 4 | ebcdic decimal(4, 0) |
| Transaction Date | RDT_TRANSACTION_DATE / RDT_DR_DATE_OF_ITEM | 0 | 8 | ebcdic decimal(8, 0) |
| Transaction Type | --- | 170 | 1 | ebcdic string(1) |
| Unique Transaction Identifier(TID) | RTI_REG_INDUSTRY_TRAN_ID | 132 | 16 | ebcdic decimal(16,0) |

FIG. 5

SYSTEMS AND METHODS FOR MULTI-PURSE TRANSACTION FILE SPLITTING

FIELD OF THE INVENTION

The present invention relates generally to systems and methods for distributing transaction files among accounts, including systems and methods for distributing transaction files among accounts corresponding to a physical card.

BACKGROUND OF THE INVENTION

Many consumers have multiple debit accounts associated with traditional debit accounts, health savings accounts, and reimbursement accounts, among others. These users are burdened with carrying multiple debit cards on their person, each associated with a different account. This is because conventional debit card platforms rely on a single file feed for all transactions related to that platform. Therefore, there is a need for improving debit card platforms such that they can support multiple accounts with a single file feed.

SUMMARY OF THE INVENTION

Accordingly, an object of the invention is to provide systems and methods for distributing transaction files among accounts. It is an object of the invention to provide systems and methods for receiving a transaction file from a transaction processing entity and identifying at least one purse segment in the transaction file. It is an object of the invention to provide systems and methods for extracting transaction data from the transaction file, storing the extracted transaction data into a distribution file, and transmitting the distribution file to an account processing system. It is an object of the invention to provide systems and methods for distributing transaction files among accounts corresponding to a physical card.

In some aspects, a computerized method for distributing transaction files among accounts corresponding to a physical card includes receiving, by a server computing device, a transaction file from a transaction processing entity. Each transaction in the transaction file is associated with a physical card. The method further includes identifying, by the server computing device, at least one purse segment in the transaction file. Each purse segment corresponds to a transaction associated with the physical card.

The method also includes, for each of the at least one purse segments, identifying, by the server computing device, a purse ID corresponding to at least one account associated with the physical card. Further, the method includes, for each of the at least one purse segments, extracting, by the server computing device, transaction data from the transaction file corresponding to the purse ID. The method also includes, for each of the at least one purse segments, storing, by the server computing device, the transaction data corresponding to the purse ID into a distribution file. Further, the method includes, for each of the at least one purse segments, transmitting, by the server computing device, the distribution file to an account processing system.

In some embodiments, the server computing device is further configured to delete the distribution file after transmission to the account processing system. In other embodiments, the transaction file comprises at least of an authorization master file, a monetary detail file, a balance reconciliation file, or a card sponsor file.

In some embodiments, the accounts associated with the physical card includes a health savings account and a reimbursement account. For example, in some embodiments, the account processing system is associated with one of the health savings account or the reimbursement account.

In some embodiments, the server computing device is further configured to encrypt the distribution file with a key. For example, in some embodiments, the server computing device is further configured to generate the key while connecting to the account processing system. In other embodiments, the account processing system is configured to decrypt the distribution file with the key.

In some embodiments, the transaction data includes a transaction date, a transaction amount, merchant details, and purse details. In other embodiments, the server computing device is further configured to mask confidential information in the distribution file.

In some aspects, a system for distributing transaction files among accounts corresponding to a physical card includes a server computing device communicatively coupled to a transaction processing entity and an account processing system over a network. The server computing device is configured to receive a transaction file from the transaction processing entity. Each transaction in the transaction file is associated with a physical card. The server computing device is also configured to identify at least one purse segment in the transaction file. Each purse segment corresponds to a transaction associated with the physical card.

Further, the server computing device is configured to identify, for each of the at least one purse segments, a purse ID corresponding to at least one account associated with the physical card. The server computing device is also configured to extract, for each of the at least one purse segments, transaction data from the transaction file corresponding to the purse ID. The server computing device is further configured to store, for each of the at least one purse segments, the transaction data corresponding to the purse ID into a distribution file. The server computing device is also configured to transmit, for each of the at least one purse segments, the distribution file to the account processing system.

In some embodiments, the server computing device is further configured to delete the distribution file after transmission to the account processing system. In other embodiments, the transaction file comprises at least of an authorization master file, a monetary detail file, a balance reconciliation file, or a card sponsor file.

In some embodiments, the accounts associated with the physical card includes a health savings account and a reimbursement account. For example, in some embodiments, the account processing system is associated with one of the health savings account or the reimbursement account.

In some embodiments, the server computing device is further configured to encrypt the distribution file with a key. For example, in some embodiments, the server computing device is further configured to generate the key while connecting to the account processing system. In other embodiments, the account processing system is configured to decrypt the distribution file with the key.

In some embodiments, the transaction data includes a transaction date, a transaction amount, merchant details, and purse details. In other embodiments, the server computing device is further configured to mask confidential information in the distribution file.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a diagram showing a visualization of an exemplary architecture for distributing transaction files among accounts, according to embodiments of the technology described herein.

FIG. 4 is a diagram showing a visualization of exemplary transaction data extracted from a transaction file, according to embodiments of the technology described herein.

FIG. 5 is a diagram showing a visualization of exemplary distribution data from a distribution file, according to embodiments of the technology described herein.

DETAILED DESCRIPTION OF THE INVENTION

In some aspects, the systems and methods described herein can include one or more mechanisms or methods for distributing transaction files among accounts. The system and methods can include mechanisms or methods for receiving a transaction file from a transaction processing entity and identifying at least one purse segment in the transaction file. The systems and methods described herein can provide systems and methods for extracting transaction data from the transaction file, storing the extracted transaction data into a distribution file, and transmitting the distribution file to an account processing system. The systems and methods described herein can facilitate users with systems and methods for distributing transaction files among accounts corresponding to a physical card.

Figure 1:
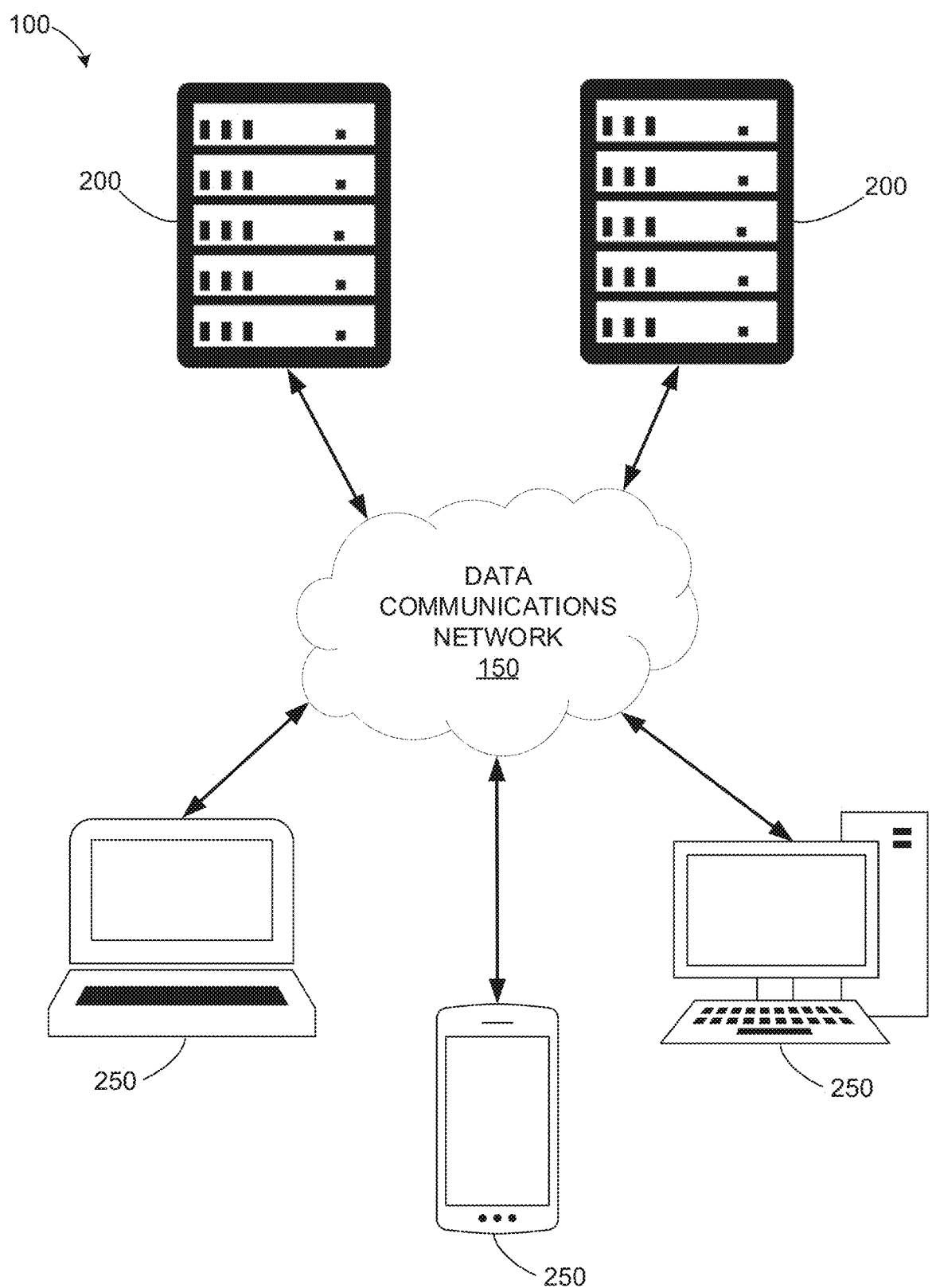
FIG. 1 is a block diagram of an exemplary data communications network, according to embodiments of the technology described herein.
Figure 2:
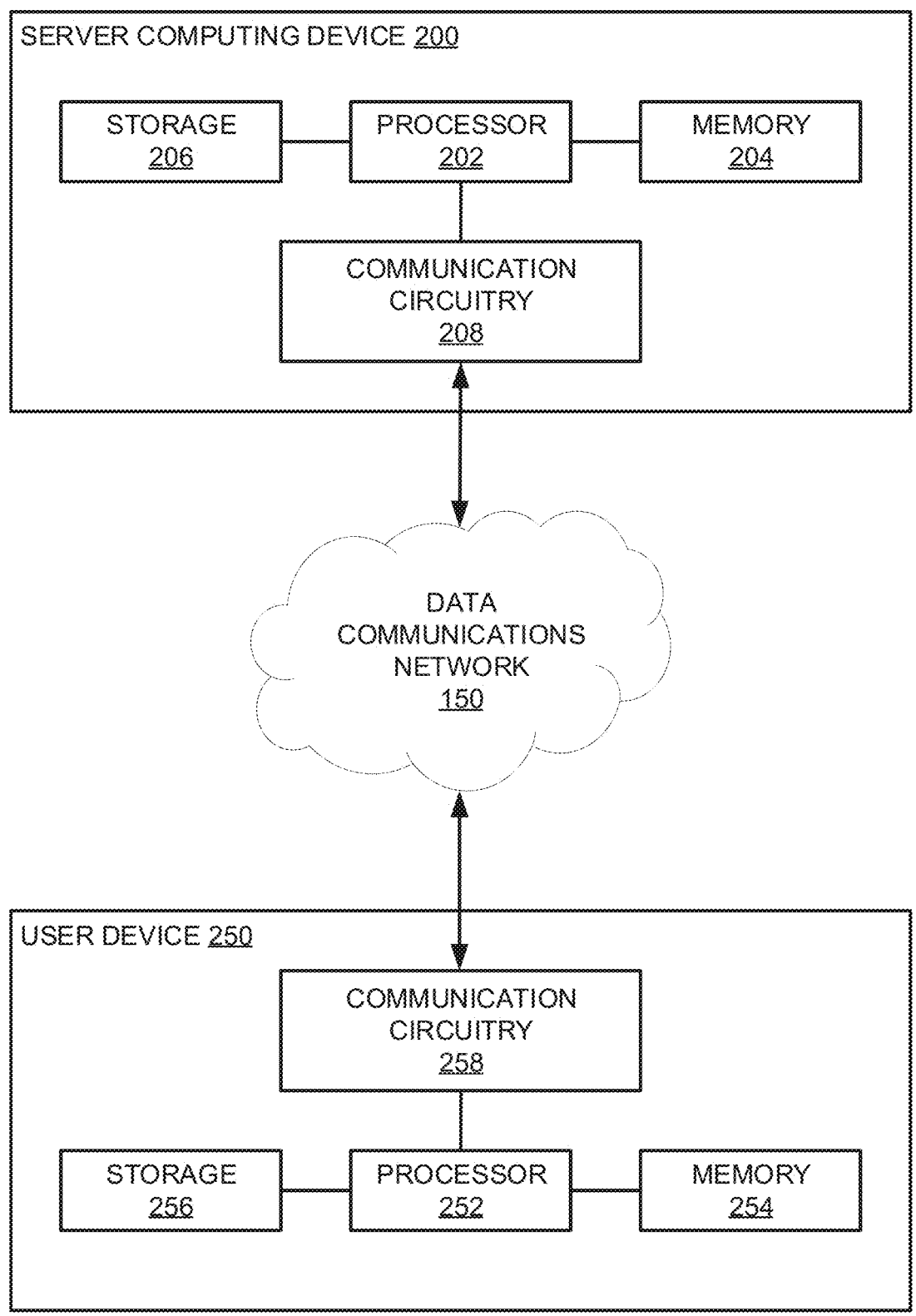
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150.

Communication circuitry 208 and communication circuitry 258 can use Bluetooth, Wi-Fi, or any comparable data transfer connection. The user devices 250 can include personal workstations, laptops, tablets, mobile devices, or any other comparable device.

The systems and methods described herein allow for a user to have multiple benefits accounts linked to a single plastic or debit card. The multiple benefits accounts may include, for example, a health savings account and a reimbursement account. The systems and methods described herein make payments and claims easier to process from a single card, as merchant information and product SKU level data allows for the card to automatically "pull" from the right account. If the user does not have sufficient balance in one account, the debit card can automatically pull the rest of the balance from the next eligible account in the hierarchy.

For example, an exemplary architecture 300 for distributing transaction files among accounts using communications system 100 is illustrated in FIG. 3. Architecture 300 facilitates the distribution of transactions received from a transaction processing entity 310. The transaction file 320 received from the transaction processing entity 310 includes purse segments 322 and transaction data 324. A purse is an account linked to the physical card. Each purse segment 322 corresponds to a transaction associated with a particular account. The transaction file 320 can include at least one of an authorization master file, a monetary detail file, a balance reconciliation file, or a card sponsor file. An authorization master file provides information about all outstanding or open authorizations. There include transactions that are not settled. A monetary detail file provides information about the transactions settled by the merchant or the network. A balance reconciliation file includes a full list of debit cards on the stacked platform, the accounts/purses linked to each card account, and their respective balance detail. The balance reconciliation file facilitates the reconciliation of any purse balances with the transaction processing entity 310.

Each of the transaction file 320 types have different records layouts, with purse information at non-fixed locations. The transaction files 320 have segments, based on the data in them, and the segment positions differ based on the type of record. For example, referring to FIG. 4, exemplary transaction data 324 extracted from a transaction file 320 is illustrated. The transaction data 324 can include the transaction date, the total transaction amount, merchant details, the purse amount, and the unique transaction identifier, among others. Architecture 300 extracts the transaction data 324 associated with a purse ID in the purse segment 322. A purse ID is an 8-byte length identifier uniquely mapping to a purse that is associated with the card. The extracted transaction data 324 is then stored in respective distribution files 340 and transmitted to respective account processing systems 350. For example, referring to FIG. 5, exemplary distribution data from a distribution file 340 is illustrated.

Generally, conventional systems are used at the point of sale for real time authorization of transaction activity. Architecture 300 provides an infrastructure and logic that can split the end of day reconciliation files to be sent to the entities/partners managing different accounts. In some embodiments, architecture 300 is built on a platform that conforms to the HIPAA & PHI rules for any health care transaction activity, and masks information managed by other partners. The split logic is applicable for the multiple files received for the stacked card platform. The file lengths can be variable, and each transaction record can have a different segment. Each segment has its own format for the data layout. The mapping for the segment-record-file layout is part of the job that is initiated on the arrival of the file. The infrastructure is built when a transaction file 320 arrives, performs the file split logic, and then the setup is destroyed which incurs minimal cost for the processing (instead of having it active 24/7). In some embodiments, the transaction files 320 received from the transaction processing entity 310 are deleted once the split completes, and the split distribution files 340 are transmitted to the respective account processing systems 350.

Figure 6:
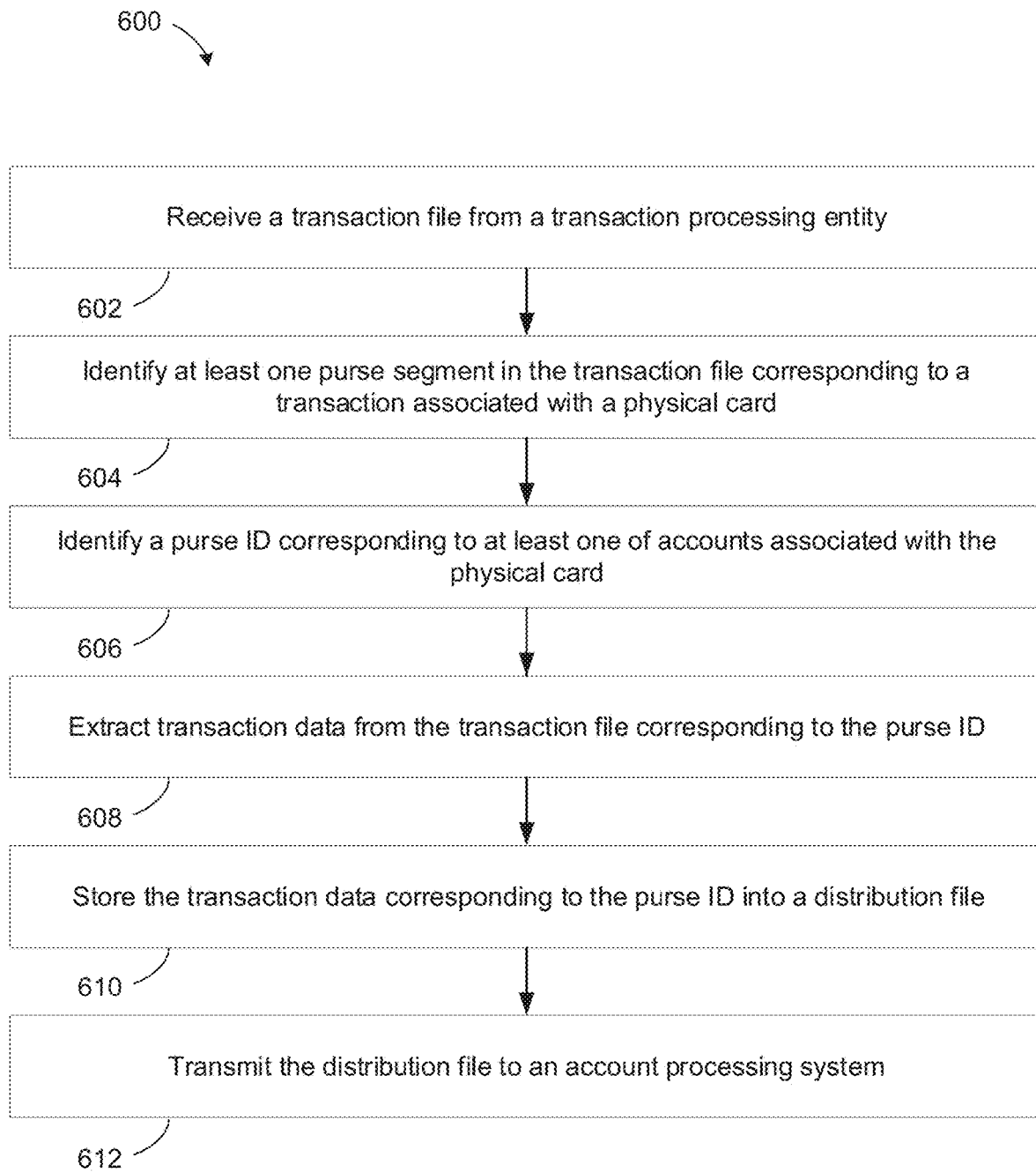
FIG. 6 is a flow diagram of a computer-implemented method for distributing transaction files among accounts using the exemplary architecture of FIG. 3, according to embodiments of the technology described herein.

Referring to FIG. 6, a process 600 for distributing transaction files 320 among accounts corresponding to a physical card is illustrated. The process 600 begins by receiving, by a server computing device 200, a transaction file 320 from a transaction processing entity 310 in step 602. In some embodiments, each transaction in the transaction file 320 is associated with a physical card. For example, in some embodiments, the transaction file 320 includes at least one of an authorization master file, a monetary detail file, a balance reconciliation file, or a card sponsor file.

Process 600 continues by identifying, by the server computing device 200, at least one purse segment 322 in the transaction file 320 in step 604. Each purse segment 322 corresponds to a transaction associated with the physical card. Process 600 continues by, for each of the at least one purse segments 322, identifying, by the server computing device 200, a purse ID corresponding to at least one account associated with the physical card in step 606. For example, in some embodiments, the accounts associated with the physical card include a health savings account and a reimbursement account.

Process 600 continues by, for each of the at least one purse segments 322, extracting, by the server computing device 200, transaction data 324 from the transaction file 320 corresponding to the purse ID in step 608. For example, in some embodiments, the transaction data 324 includes a transaction date, a transaction amount, merchant details, and purse details. Process 600 continues by, for each of the at least one purse segments 322, storing, by the server computing device 200, the transaction data 324 corresponding to the purse ID into a distribution file 340 in step 610. In some embodiments, the server computing device 200 is further configured to mask confidential information in the distribution file 340.

Process 600 finishes by, for each of the at least one purse segments 322, transmitting, by the server computing device 200, the distribution file 340 to an account processing system 350 in step 612. For example, in some embodiments, the account processing system 350 is associated with one of a health savings account or a reimbursement account. In some embodiments, the server computing device 200 is further configured to delete the distribution file 340 after transmission to the account processing system 350.

In some embodiments, the server computing device 200 is further configured to encrypt the distribution file 340 with a key. For example, in some embodiments, the server computing device 200 is further configured to generate the key while connecting to the account processing system 350. In some embodiments, the account processing system 350 is configured to decrypt the distribution file with the key.

In some aspects, process 600 can be implemented on a system 300 for distributing transaction files 320 among accounts corresponding to a physical card. The system includes a server computing device 200 communicatively coupled to a transaction processing entity 310 and an account processing system 350 over a network 150. The server computing device 200 is configured to receive a transaction file 320 from the transaction processing entity 310. The transaction file 320 is associated with a physical card. The server computing device 200 is also configured to identify at least one purse segment 322 in the transaction file 320. Each purse segment 322 corresponds to a transaction associated with the physical card.

Further, for each of the at least one purse segments 322, the server computing device 200 is configured to identify a purse ID corresponding to at least one account associated with the physical card. The server computing device 200 is also configured to, for each of the at least one purse segments 322, extract transaction data 324 from the transaction file 320 corresponding to the purse ID. Further, the server computing device 200 is configured to, for each of the at least one purse segments 322, store the transaction data 324 corresponding to the purse ID into a distribution file 340. The server computing device 200 is further configured to, for each of the at least one purse segments 322, transmit the distribution file 340 to the account processing system 350.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A computerized method for distributing transaction files among a plurality of accounts corresponding to a physical card, the method comprising:
   recording, by a point of sale (POS) terminal, a plurality of transaction records corresponding to payment activity for a plurality of different physical cards, wherein each physical card is associated with a plurality of different accounts including at least one health savings account, and wherein each transaction record includes a purse ID corresponding to one of the different accounts of the physical card;
   transmitting, by the POS terminal, the plurality of transaction records to a transaction processing entity computing device;
   generating, by the transaction processing entity computing device, a plurality of transaction files for the plurality of transactions, each transaction file comprising a different file type;

receiving, by a server computing device, the plurality of transaction files from the transaction processing entity computing device;

for each transaction file in the plurality of transaction files:
- determining, by the server computing device, a file type of the transaction file;
- generating, by the server computing device, a data layout mapping for the transaction file based upon the file type of the transaction file;
- identifying, by the server computing device, at least one purse segment in the transaction file using a purse segment location defined by the data layout mapping of the transaction file, wherein each purse segment corresponds to a transaction associated with the physical card; and
- for each of the at least one purse segments:
  - identifying, by the server computing device, a purse ID in the purse segment using a purse ID location defined by the data layout mapping of the transaction file;
  - extracting, by the server computing device, transaction data from the transaction file corresponding to the purse ID using a transaction data location defined by the data layout mapping of the transaction file;
  - masking, by the server computing device, one or more personal data elements in the transaction data when the purse ID corresponds to a health savings account; and
  - storing, by the server computing device, the transaction data corresponding to the purse ID in a distribution file;
- deleting, by the server computing device, the plurality of transaction files and the corresponding data layout mappings from a memory of the server computing device;
- identifying, by the server computing device for each distribution file, an account processing system corresponding to the purse ID in the distribution file; and
- transmitting, by the server computing device, each of the distribution files to a separate account processing system corresponding to the purse ID in the distribution file, including generating a separate encryption key for each account processing system upon connecting to the account processing system and encrypting the distribution file using the encryption key prior to transmission.

2. The computerized method of claim 1, wherein the server computing device is further configured to delete the distribution file after transmission to the account processing system.

3. The computerized method of claim 1, wherein the file types for the plurality of transaction files comprise an authorization master file type, a monetary detail file type, a balance reconciliation file type, and a card sponsor file type.

4. The computerized method of claim 1, wherein the plurality of accounts associated with the physical card includes a reimbursement account.

5. The computerized method of claim 4, wherein the account processing system is associated with one of the health savings account or the reimbursement account.

6. The computerized method of claim 1, wherein the account processing system is configured to decrypt the distribution file with the corresponding encryption key received from the server computing device.

7. The computerized method of claim 1, wherein the transaction data comprises a transaction date, a transaction amount, merchant details, and purse details.

8. The computerized method of claim 1, wherein the server computing device is further configured to mask confidential information in the distribution file.

9. A system for distributing transaction files among a plurality of accounts corresponding to a physical card, the system comprising:
- a point of sale (POS) terminal configured to:
  - record a plurality of transaction records corresponding to payment activity for a plurality of different physical cards, wherein each physical card is associated with a plurality of different accounts including at least one health savings account, and wherein each transaction record includes a purse ID corresponding to one of the different accounts of the physical card, and
  - transmit the plurality of transaction records to a transaction processing entity computing device;
- the transaction processing entity computing device configured to generate a plurality of transaction files for the plurality of transactions, each transaction file comprising a different file type; and
- a server computing device communicatively coupled to the transaction processing entity computing device and a plurality of account processing systems over a network, the server computing device configured to:
  - receive a plurality of transaction files from the transaction processing entity computing device;
  - for each transaction file in the plurality of transaction files:
    - determine a file type of the transaction file;
    - generate a data layout mapping for the transaction file based upon the file type of the transaction file;
    - identify at least one purse segment in the transaction file using a purse segment location defined by the data layout mapping of the transaction file, wherein each purse segment corresponds to a transaction associated with the physical card; and
    - for each of the at least one purse segments:
      - identify a purse ID in the purse segment using a purse ID location defined by the data layout mapping of the transaction file;
      - extract transaction data from the transaction file corresponding to the purse ID using a transaction data location defined by the data layout mapping of the transaction file;
      - mask one or more personal data elements in the transaction data when the purse ID corresponds to a health savings account; and
      - store the transaction data corresponding to the purse ID in a distribution file;
  - delete the plurality of transaction files and the corresponding data layout mappings from a memory of the server computing device;
  - identify, for each distribution file, an account processing system corresponding to the purse ID in the distribution file; and
  - transmit each of the distribution files to a separate account processing system corresponding to the purse ID in the distribution file, including generating a separate encryption key for each account processing system upon connecting to the account processing system and encrypting the distribution file using the encryption key prior to transmission.

10. The system of claim 9, wherein the server computing device is further configured to delete the distribution file after transmission to the account processing system.

11. The system of claim 9, wherein the file types for the plurality of transaction files comprise an authorization master file type, a monetary detail file type, a balance reconciliation file type, and a card sponsor file type.

12. The system of claim 9, wherein the plurality of accounts associated with the physical card includes a reimbursement account.

13. The system of claim 12, wherein the account processing system is associated with one of the health savings account or the reimbursement account.

14. The system of claim 9, wherein the account processing system is configured to decrypt the distribution file with the corresponding encryption key received from the server computing device.

15. The system of claim 9, wherein the transaction data comprises a transaction date, a transaction amount, merchant details, and purse details.

* * * * *